(12) United States Patent
Ponsini et al.

(10) Patent No.: US 10,164,963 B2
(45) Date of Patent: Dec. 25, 2018

(54) ENFORCING SERVER AUTHENTICATION BASED ON A HARDWARE TOKEN

(71) Applicant: Oracle International Corporation, Redwood Shores, CA (US)

(72) Inventors: Nicolas Ponsini, Mougins (FR); Eric Vetillard, Valbonne (FR)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 102 days.

(21) Appl. No.: 15/055,410

(22) Filed: Feb. 26, 2016

(65) Prior Publication Data

US 2017/0118196 A1 Apr. 27, 2017

Related U.S. Application Data

(60) Provisional application No. 62/245,830, filed on Oct. 23, 2015.

(51) Int. Cl.
*H04L 29/06* (2006.01)

(52) U.S. Cl.
CPC ...... *H04L 63/0807* (2013.01); *H04L 63/0435* (2013.01); *H04L 63/0823* (2013.01); *H04L 63/0876* (2013.01)

(58) Field of Classification Search
CPC ............. H04L 63/0435; H04L 63/0807; H04L 63/0823; H04L 63/0876
See application file for complete search history.

(56) References Cited

U.S. PATENT DOCUMENTS

| 6,816,900 | B1 * | 11/2004 | Vogel | H04L 9/3236 |
| | | | | 709/203 |
| 9,716,594 | B2 * | 7/2017 | Offenberg | G06F 21/64 |
| 2004/0205330 | A1 * | 10/2004 | Godfrey | G06Q 10/107 |
| | | | | 713/150 |

(Continued)

OTHER PUBLICATIONS

RSA Laboratories, "PKCS #11 v2.20: Cryptographic Token Interface Standard", ftp://ftp.rsasecurity.com/pub/pkcs/pkcs-11/v2-20/pkcs-11v2-20.pdf, Jun. 28, 2004, 407 pages.

*Primary Examiner* — Joseph P Hirl
*Assistant Examiner* — Sayed Aresh Beheshti Shirazi
(74) *Attorney, Agent, or Firm* — Fish IP Law, LLP (57) ABSTRACT

A method may include receiving, by a hardware token from a client device, a chain of certificates including a server certificate and a first root certificate authority (CA) certificate. The method may further include determining, by the hardware token, to offload validation of one or more certificates in the chain of certificates to the client device, and verifying, by a cryptography application running in a memory of the hardware token, using a trusted root CA certificate stored in the hardware token, each certificate in the chain of certificates. The method may further include authenticating, by the hardware token and based on the verification, a public key of a server certificate, encrypting, by the cryptography application, a secret message using the authenticated public key of the server certificate to obtain an encrypted secret message, and sending, by the hardware token, the encrypted secret message to the client device.

15 Claims, 6 Drawing Sheets

(56) References Cited

U.S. PATENT DOCUMENTS

| | | | |
|---|---|---|---|
| 2006/0053291 A1* | 3/2006 | Brown | H04L 9/3247 713/175 |
| 2007/0241182 A1* | 10/2007 | Buer | G06Q 20/341 235/380 |
| 2008/0040285 A1* | 2/2008 | Wankmueller | G06Q 20/32 705/67 |
| 2009/0031131 A1* | 1/2009 | Qiu | H04L 63/0442 713/172 |
| 2010/0058317 A1* | 3/2010 | Braams | G06F 21/572 717/171 |
| 2013/0061038 A1* | 3/2013 | Pao | H04L 63/0823 713/151 |
| 2013/0061281 A1* | 3/2013 | Pao | H04L 9/0891 726/1 |
| 2013/0214899 A1* | 8/2013 | Herscovitch | G05B 1/01 340/5.53 |
| 2013/0222107 A1* | 8/2013 | Herscovitch | G05B 1/01 340/5.6 |
| 2014/0020082 A1* | 1/2014 | Leggette | G06F 3/0614 726/10 |
| 2014/0040611 A1* | 2/2014 | Tenenboym | H04L 9/3236 713/157 |
| 2015/0341325 A1* | 11/2015 | Al Jabri | H04L 63/0442 713/156 |
| 2015/0350894 A1* | 12/2015 | Brand | H04L 63/0435 380/270 |
| 2016/0013945 A1* | 1/2016 | Offenberg | G06F 21/64 713/176 |
| 2016/0373418 A1* | 12/2016 | Stahl | G06F 21/33 |
| 2017/0097900 A1* | 4/2017 | Fielder | G06F 21/78 |

* cited by examiner

ENFORCING SERVER AUTHENTICATION BASED ON A HARDWARE TOKEN

CROSS-REFERENCE TO RELATED APPLICATIONS

This non-provisional patent application claims priority under 35 U.S.C. § 119(e) to U.S. Provisional Patent Application Ser. No. 62/245,830, filed on Oct. 23, 2015, and is hereby incorporated by reference in its entirety.

BACKGROUND

Authentication typically focuses on verifying the credentials of a client device or browser accessing a server. However, it is also important for a client device or browser to verify the credentials of a server. Hardware tokens connected to a client device may assist with authentication, but are usually passive components implementing a dedicated cryptographic library, in part due to limited computational resources.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including receiving, by a hardware token from a client device, a chain of certificates including a server certificate and a first root certificate authority (CA) certificate. Each certificate in the chain of certificates includes a public key and a signature. The method further includes determining, by the hardware token, to offload validation of one or more certificates in the chain of certificates to the client device, and verifying, by a cryptography application running in a memory of the hardware token, using a trusted root CA certificate stored in the hardware token, each certificate in the chain of certificates. The method further includes authenticating, by the hardware token and based on the verification, a public key of a server certificate in the chain of certificates, encrypting, by the cryptography application, a secret message using the authenticated public key of the server certificate to obtain an encrypted secret message, and sending, by the hardware token, the encrypted secret message to the client device.

In general, in one aspect, one or more embodiments relate to a system including a client device configured to receive, over a network, a chain of certificates including a server certificate and a first root CA certificate. Each certificate in the chain of certificates includes a public key and a signature. The system further includes a hardware token, communicatively associated with the client device, including a memory and a cryptography application running in the memory. The hardware token is configured to receive, from the client device, the chain of certificates, determine to offload validation of one or more certificates in the chain of certificates to the client device, verify, using a trusted root CA certificate stored in the hardware token, each certificate in the chain of certificates, authenticate, based on the verification, a public key of a server certificate in the chain of certificates, encrypt a secret message using the authenticated public key of the server certificate to obtain an encrypted secret message, and send the encrypted secret message to the client device.

In general, in one aspect, one or more embodiments of the invention relate to a non-transitory computer readable medium including instructions that, when executed by a processor, perform a method including receiving, by a hardware token from a client device, a chain of certificates including a server certificate and a first root CA certificate. Each certificate in the chain of certificates includes a public key and a signature. The method further includes determining, by the hardware token, to offload validation of one or more certificates in the chain of certificates to the client device, and verifying, by a cryptography application running in a memory of the hardware token, using a trusted root CA certificate stored in the hardware token, each certificate in the chain of certificates. The method further includes authenticating, by the hardware token and based on the verification, a public key of a server certificate in the chain of certificates, encrypting, by the cryptography application, a secret message using the authenticated public key of the server certificate to obtain an encrypted secret message, and sending, by the hardware token, the encrypted secret message to the client device.

Other aspects will be apparent from the following description and the appended claims.

DETAILED DESCRIPTION

Specific embodiments will now be described in detail with reference to the accompanying figures. Like elements in the various figures are denoted by like reference numerals for consistency.

In the following detailed description of embodiments, numerous specific details are set forth in order to provide a more thorough understanding of the disclosure. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments disclosed herein relate to a method, system and non-transitory computer readable medium for authenticating a server. In particular, one or more embodiments are directed to a method that uses a hardware token communicatively connected to a client device to verify a chain of certificates sent from a server and used during a handshake protocol. The hardware token may provide a secure physical barrier preventing access by software external to the token, and may be constrained by limited computational resources and/or a limited interface. Once the certificate chain is received, apart from non-cryptographic validity checks on certificate structure and contents, cryptographic operations regarding certificate signature verification are redirected to the hardware token. In one or more embodiments, the chain of certificates begins with a server certificate and may include intermediate certificate authority (CA) certificates, before ending with a root CA certificate. In one or more embodiments, the signature of a certificate may be verified using a public key of the next certificate in the chain, where the hardware token may track the state of the verification by managing a list of public keys corresponding to the certificates in the chain. When the next certificate in the chain is a trusted root certificate authority (CA) certificate stored in the hardware token, then the server certificate at the beginning of the chain may be authenticated. The hardware token may use the authenticated server public key to encrypt and send a secret message to the server to establish secure communication between the client device and the server.

Figure 1:
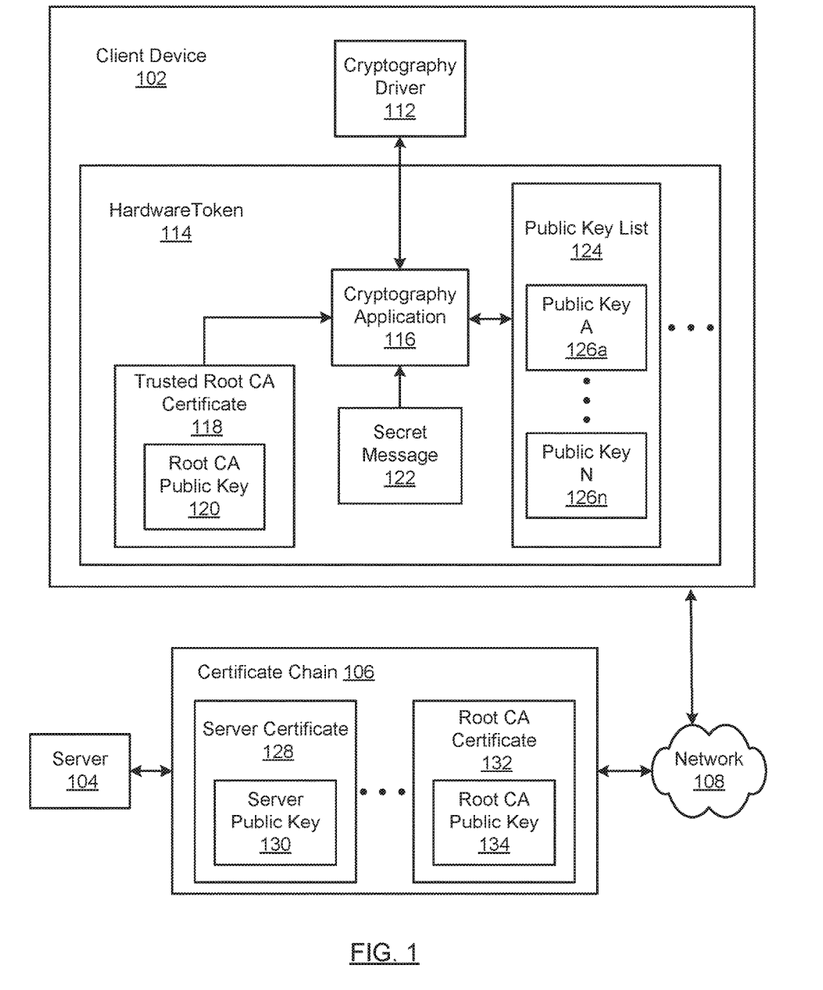
FIG. 1 shows a system in accordance with one or more embodiments disclosed herein.

FIG. 1 shows a system in accordance with one or more embodiments. As shown in FIG. 1, the system includes a client device (102), a server (104), a certificate chain (106), and a network (108). In one or more embodiments, the client device (102) may be the client device (726) described with respect to FIG. 7B, or may be the computing system (700) described with respect to FIG. 7A and the accompanying description below. Furthermore, the server (104) may be the computing system (700) described with respect to FIG. 7A, and the network (108) may be the network (720) described with respect to FIG. 7B.

In one or more embodiments, a client device (102) may be an internet of things (IoT) device. In one or more embodiments, an IoT device may include sensors and/or actuators, a network (108) connection, and may be unattended and/or lack an interactive user interface, which imposes additional security requirements due to the absence of a user in the loop to observe potentially unsafe or suspicious device behavior. In an IoT scenario, embodiments disclosed herein may be directed to enforcing the security of an IoT gateway in authenticating an IoT Cloud Service by leveraging the hardware token within the client (gateway) device. Other examples of IoT devices include devices controlling access to various types of industrial equipment (e.g., factory and capital equipment used in manufacturing), various types of consumer-facing equipment (e.g., major appliances, such as refrigerators, ovens, televisions, radios, set-top-boxes, laundry machines, heating systems, and alarm clocks), and medical devices. Alternatively, the client device may be any computing device, such as a smart phone, a tablet, a laptop computer, a desktop computer, etc.

In some embodiments, the client device (102) may be equipped with a user interface. In one or more embodiments disclosed herein, the client device (102) may be operated by a user (not shown). The user may be any person or entity using the client device (102). The client device (102) may be owned by the user, or in one or more embodiments, may be owned by a company, university, government agency or other entity that permits the use of the client device (102) by the user.

In one or more embodiments, a server (104) is any entity that provides services, content, and/or any other form of information to a client device (102). In one or more embodiments, the server (104) includes one or more computing devices (not shown), of which at least a portion include network (108) connectivity in order to interact with, at least, one or more devices (e.g., client device (102)). In one or more embodiments disclosed herein, the server (104) is software, firmware, hardware (e.g., circuitry, one or more computing devices, etc.), and/or any combination thereof capable of receiving requests (e.g., from a client such as a device) and/or responding to requests. For example, the server (104) may be software executing on one or more computing devices (e.g., one or more rack servers in a server rack located in a datacenter) which are operatively connected to, at least, one or more clients (e.g., client device (102)).

In one or more embodiments, to preserve the security and integrity of the client device (102), the client device (102) and the server (104) may communicate via a secure protocol, such as a Transport Layer Security (TLS) protocol. In one or more embodiments, a goal of the client device (102) is to authenticate the server (104) so that the client device (102) can safely communicate with the server (104) over the network (108). In one or more embodiments, the secure protocol may require 1-way authentication (of either the client device (102) or the server (104)) or 2-way authentication (of both the client device (102) and the server (104)). In one or more embodiments, authentication of the server (104) by the client device (102) may be performed relative to a certificate chain (106) sent by the server (104) to the client device (102) over a network (108).

In one or more embodiments, the certificate chain (106) begins with a server certificate (128) signed by a Certificate Authority (CA), which is a third-party entity specializing in verifying identities. That is, the CA signing the server certificate (128) is a trusted third party that guarantees the identity of the server (104) named in the server certificate (128). CAs may be organized in chains of CAs that originate from a root CA.

CA certificates play an important role within a public key infrastructure (PKI), namely allowing other parties (e.g., the client device (102)) to rely upon digital signatures created using a private key corresponding to a certified public key (130, 134). A certificate (128, 132) represents a guarantee by the CA signing the certificate (128, 132) that the name and public key (130, 134) in the certificate (128, 132) match each other. The CA is a third party that is trusted by both the subject (owner, such as the server (104)) of the certificate (128, 132) and by the party (e.g., the client device (102)) relying on the validity of the certificate (128, 132).

Authenticating the server (104) may also require validating the identity of the CA that signed the server certificate (128). In one or more embodiments, the identity of each CA may be validated by another CA, and so on. Therefore, the chain of certificates (106) may include a certificate that validates the identity of each CA issuing a certificate in the certificate chain (106). In one or more embodiments, the certificate chain (106) may end with a root CA certificate (132) that is unsigned or self-signed, i.e., signed by their own private keys. A small number of root CA certificates (132) and root public keys (134) (also called "trust anchors") are used to anchor various certificate chains (106). A collection of root CA certificates are typically pre-installed in browsers and various devices, such as the trusted root CA certificate (118) in the hardware token (114).

Each certificate may include a collection of information including a public key and a signature. For example, server certificate (128) includes a server public key (130) and root CA certificate (132) includes a root CA public key (134). In the context of a PKI scheme, a public key of one certificate may be used to verify a signature of another certificate.

In one or more embodiments, the structure of a certificate (128, 132) is defined by a standard (e.g., the X.509 standard), requiring that the certificate (128, 132) contain specific fields. Some examples of certificate fields include: version number, serial number, certificate algorithm identifier, issuer name, validity period, subject name, subject public key information, issuer unique identifier, subject unique identifier, extensions, and certification authority's digital signature. In one or more embodiments, both the client device (102) and the hardware token (114) include functionality to (non-cryptographically) validate a certificate by checking the structure and contents of one or more of the fields of a certificate (128, 132). In one or more embodiments, the hardware token (114) may determine that non-cryptographic certificate validation operations should be offloaded to the client device (102).

Continuing with FIG. 1, in one or more embodiments, the client device (102) may include a cryptography driver (112) and a hardware token (114). In one or more embodiments, a hardware token (114) is a programmable, physically protected, secure area for storing and processing sensitive data, such as keys used during cryptographic operations. In one or more embodiments, the hardware token (114) may have limited computational resources (e.g., limited memory). In one or more embodiments, although shown within the client device (102) in FIG. 1, those of ordinary skill in the art would appreciate that the hardware token (114) may be outside of the client device and physically or wirelessly connected to the client device (102). Furthermore, in one or more embodiments, the hardware token (114) may be the computing system (700) described with respect to FIG. 7A and the accompanying description below. Examples of hardware tokens (114) may include: an embedded Secure Element (eSE) (e.g., a smartcard), and a dedicated microprocessor designed to secure hardware by integrating cryptographic keys into devices, such as microprocessors conforming to the Trusted Platform Module (TPM) for a secure cryptoprocessor. In one or more embodiments, the hardware token (114) may also be a Trusted Execution Environment (TEE) portion of the client device (102). For example, it is common for a system on a chip (SoC) to permit code execution and data manipulation in a secure area isolated from the main operating system.

In one or more embodiments, from a static perspective, the hardware token (114) provides a secure, physically protected memory area to store (via a secure initialization procedure) pre-installed CA certificates (e.g., trusted root CA certificate (118)) utilized during secure communication (e.g., a TLS handshake), thereby guaranteeing the integrity of the trusted root CA certificate (118) (i.e., the trusted root CA certificate (118) in the hardware token (114) is protected from tampering, and has therefore retained its integrity). In one or more embodiments, from a runtime perspective, the hardware token (114) physically sandboxes (e.g., isolates) and therefore protects memory containing sensitive data (e.g., the TLS pre-master secret, master secret and session keys) from software external to the hardware token (114).

In one or more embodiments, the hardware token (114) may include a cryptography application (116). In one or more embodiments, the cryptography driver (112) of the client device (102) and the cryptography application (116) of the hardware token (114) communicate by exchanging input and output parameters. In one or more embodiments, the physical protection of the hardware token (114) sandboxes (e.g., protects from spying or tampering) the cryptography application (116) relative to software external to the hardware token (114). In one or more embodiments, the cryptography driver (112) may be hardware and/or software that includes functionality to interface with a cryptography application (116) of the hardware token (114), where the cryptography application (116) includes functionality to perform various cryptographic functions related to a PKI framework. In one or more embodiments, both the cryptography driver (112) and the cryptography application (116) are collections of source code used to build software applications or components. That is, both the cryptography driver (112) and the cryptography application (116) may be collections of computer instructions written in a human-readable programming language. Both the cryptography driver (112) and the cryptography application (116) may be transformed by a compiler program into binary machine code. Compiled machine code may then be executed by a processor in order to run the applications generated from the cryptography driver (112) and the cryptography application (116).

In one or more embodiments, the cryptographic functions performed by the cryptography application (116) may include: encrypting a message (e.g., secret message (122)) using a server public key (130) to generate an encrypted message for use in establishing a secure connection (e.g., a secure handshake to setup a TLS connection), decrypting an encrypted message using an encryption key (e.g., a TLS session key) to obtain the original message, generating a pre-master key used in a secure protocol (e.g., a TLS protocol), deriving a master key, and deriving session keys. In one or more embodiments, the session keys used during a secure connection may be based on encrypting the secret message (122). In one or more embodiments, the secret message (122) may be a string of alphanumeric, binary, hexadecimal, etc. characters that may be randomly generated.

Continuing with FIG. 1, in one or more embodiments disclosed herein, the cryptography application (116) manages a series of public key lists (124), where each public key list (124) may include a sequence of public keys (126a-126n). In one or more embodiments, the cryptography application (116) may include functionality to represent the state of an ongoing authentication using a public key list (124) corresponding to a series of public keys of a certificate chain (106) (e.g., the series of public keys beginning with server public key (130) and ending with root CA public key (134), where the series of public keys corresponds to the certificate chain (106) beginning with server certificate (128) and ending with root CA certificate (132)). In one or more embodiments, each public key list (124) may be represented as a data structure storing a sequence of elements, where an element may be added or removed from the list. In one or more embodiments, the root CA certificate (118) of the hardware token (114) may be used to verify a series of public keys in a certificate chain (106).

In one or more embodiments, the cryptographic application (116) of the hardware token (114) exposes a cryptography interface, such as the PKCS #11 interface (ftp://ftp.rsasecurity.com/pub/pkcs/pkcs-11/v2-20/pkcs-11v2-20.pdf), a native cryptographic API designed to redirect cryptographic operations to dedicated hardware tokens (114). In particular, PKCS #11 abstracts cryptographic keys such that cryptographic objects are accessed through handles (opaque pointers) by the caller, and therefore cryptographic objects are not directly exposed in the caller's memory area. Thus, with PKCS #11, cryptographic objects remain protected within the hardware token (114) memory area. The PKCS #11 cryptographic API exposes mechanisms to redirect TLS-sensitive operations to the hardware token (114), including: TLS pre-master key generation, TLS master key derivation from the pre-master secret and server seed, and TLS session key derivation. With PKCS #11, both temporary and permanent cryptographic objects may be managed and protected within the hardware token (114), where a TrustStore (e.g., storing trusted root CA certificate (118)) is an example of a permanent certificate object. PKCS #11 is a native API specified in the C language (although it may be abstracted by some wrappers).

While FIG. 1 shows a configuration of components, other configurations may be used without departing from the scope of embodiments disclosed herein. For example, various components may be combined to create a single component. As another example, the functionality performed by a single component may be performed by two or more components.

Figure 2:
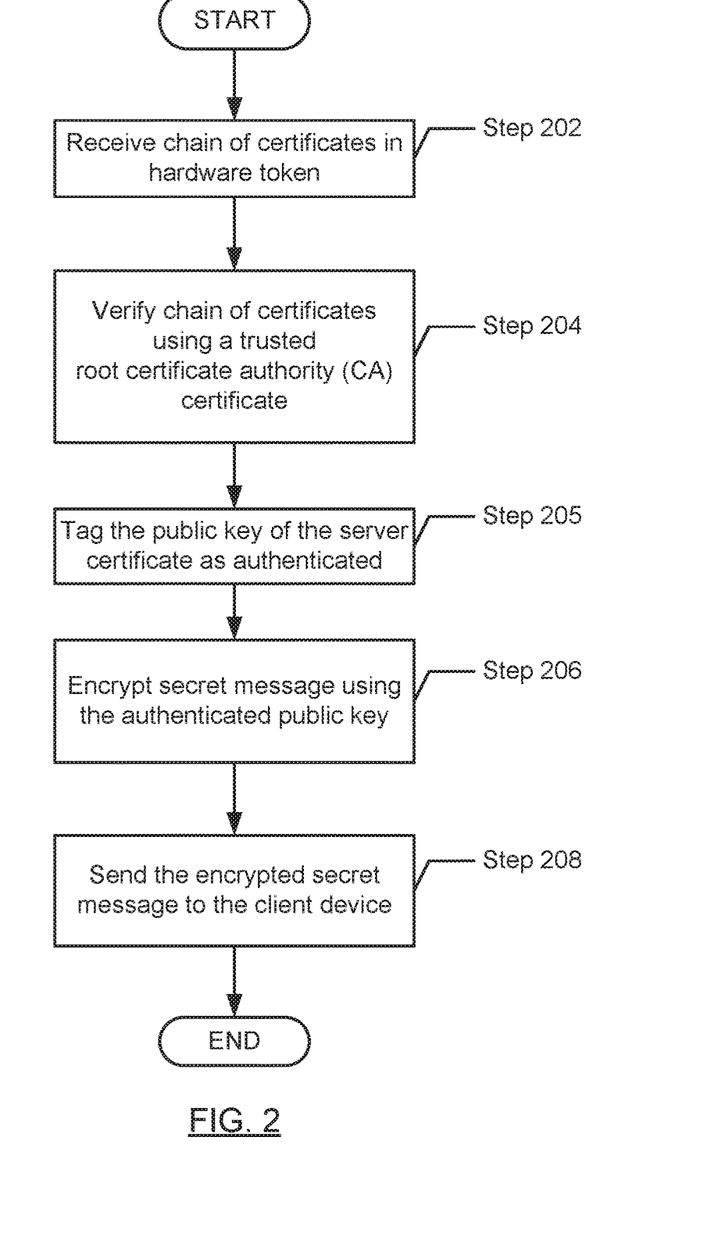
FIG. 2 and FIG. 3 show flowcharts in accordance with one or more embodiments disclosed herein.
Figure 3:
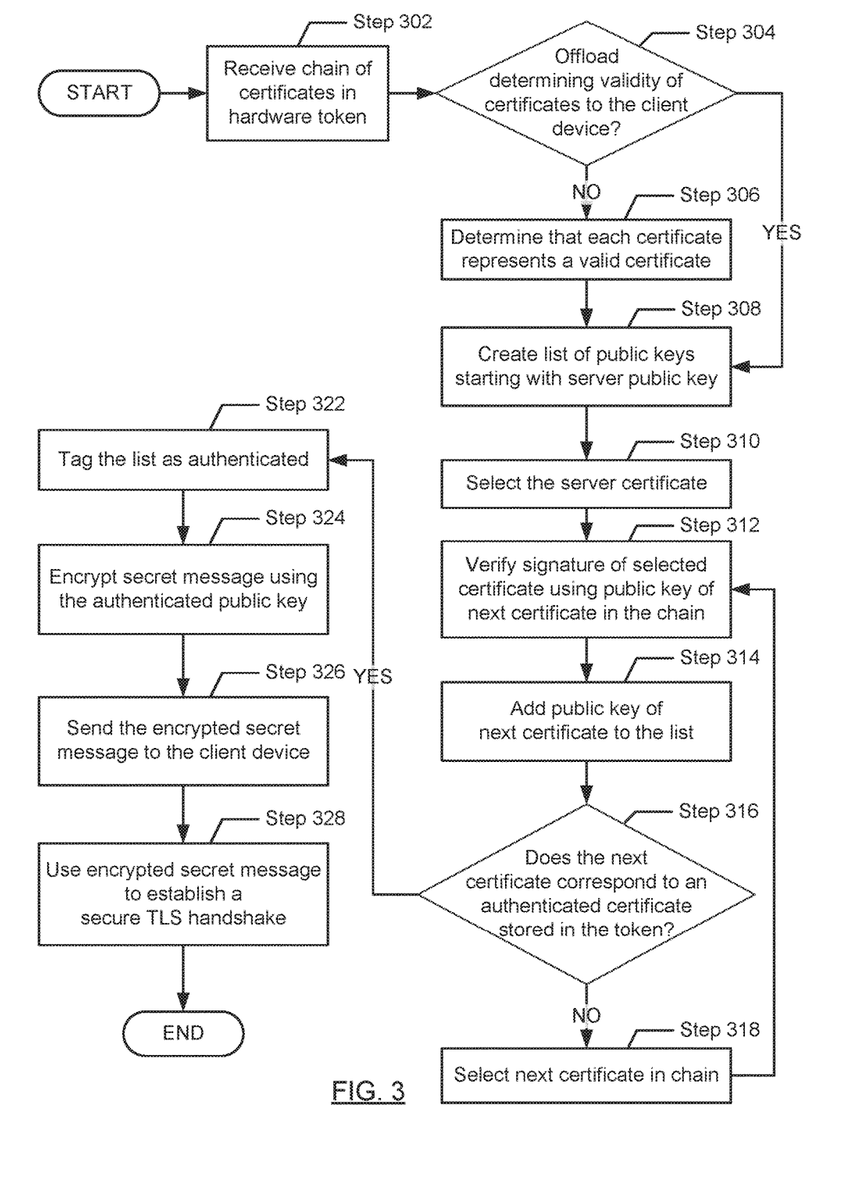

FIG. 2 and FIG. 3 show flowcharts in accordance with one or more embodiments. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments. By way of an example, determination steps may not require a processor to process an instruction unless an interrupt is received to signify that condition exists in accordance with one or more embodiments disclosed herein. As another example, determination steps may be performed by performing a test, such as checking a data value to test whether the value is consistent with the tested condition in accordance with one or more embodiments.

FIG. 2 shows a flowchart describing a method for server authentication, in accordance with one or more embodiments. One or more steps in FIG. 2 may be executed by the hardware token (114) (discussed in reference to FIG. 1).

Initially, in Step 202, a chain of certificates is received. In one or more embodiments, the chain of certificates may be received by a hardware token communicatively connected to a client device. The chain of certificates may begin with a server certificate, end with a root CA certificate, and may include intermediate CA certificates. In one or more embodiments, the chain of certificates is received all at once. Alternatively, in one or more embodiments, each certificate in the chain may be received incrementally, one at a time. For example, the manner in which the hardware token receives the chain of certificates may depend on various constraints on the hardware token, including memory constraints, processing constraints and/or interface constraints (e.g., constraints on how the cryptographic application is configured to receive input).

In Step 204, each certificate in the chain of certificates is verified, in order to confirm the identity of a server and the identities of any relevant CAs. In one or more embodiments, the chain of certificates may be verified by a cryptography application running in a memory of the hardware token. In one or more embodiments, the server certificate may be verified using the public key of the next certificate (e.g., an intermediate CA certificate) in the chain of certificates. Subsequently, each CA certificate may be verified using the public key of the next CA certificate in the chain of certificates, and so on, until a root CA certificate is encountered. A root CA certificate is verified when it matches a trusted root CA certificate stored in the hardware token, where the trusted root CA certificate is assumed to be verified and therefore provides the anchor of trust for the chain of certificates.

In one or more embodiments, the public key of a server certificate in the chain of certificates is considered to be authenticated after a successful verification of the chain of certificates beginning with the server certificate. This means that the integrity of the public key of the server certificate is guaranteed (i.e., the key has not been modified since the server certificate was issued). This also means that there is a valid chain of certification beginning with the server and continuing to various CAs, culminating at a trusted root CA (e.g., the server certificate is trusted by an intermediate CA that trusts the related root CA). In one or more embodiments, the authentication may be performed by the hardware token.

In Step 205, the public key of the server certificate is tagged as authenticated.

In Step 206, a secret message is encrypted, using the authenticated public key of the server certificate, to obtain an encrypted secret message. In one or more embodiments, the secret message may be a TLS pre-master secret. In one or more embodiments, the encryption may be performed by cryptography application of the hardware token.

In Step 208, the encrypted secret message is sent to the client device. In one or more embodiments, the encrypted secret message may be used by the client device to setup a secure connection (e.g., via a TLS protocol) with a server over a network.

Thus, using embodiments described in FIG. 2, the root CA certificate, hosted within the trusted storage of the hardware token, authenticates the public key of the server certificate. Moreover, only this authenticated server public key can be used to perform the encryption/wrapping of sensitive data hosted by the hardware token.

FIG. 3 shows a flowchart describing, in more detail than FIG. 2, the method for server authentication, in accordance with one or more embodiments. One or more steps in FIG. 3 may be executed by the hardware token (114) (discussed in reference to FIG. 1).

In Step 302, a chain of certificates is received, as discussed above in the description of Step 202. In Step 304, in one or more embodiments, a determination is made (e.g., by the hardware token) whether to offload, to an external device (e.g., the client device), validation of one or more certificates in the chain of certificates. If the hardware token offloads the validation to the client device, Step 306 below is skipped. Otherwise, the hardware token performs Step 306 below. In one or more embodiments, the determination may depend on the relative computational resources of the hardware token and the client device, in addition to various constraints on the hardware token, including memory constraints, processing constraints and/or interface constraints.

In Step 306, a determination is made regarding whether each certificate in the chain of certificates represents a valid certificate. If any certificate in the chain of certificates is invalid, then the certificate is rejected and the authentication fails. In one or more embodiments, validating a certificate may include some or all of the following: checking whether the certificate has expired (e.g., by consulting a real-time clock, or comparing to the last known date), checking whether the subject named in the certificate is in a list of trusted names (e.g., if connections are restricted to a list of specific servers), checking whether certain required fields are present in the certificate, checking whether a value in one or more fields of the certificate is within a predetermined range of values, and various other constraints on the structure and/or contents of the certificate. Those skilled in the art will appreciate that the validation of the one or more certificates are non-cryptographic operations that may be offloaded by the token based on token constraints. However, all (or a majority of) cryptographic operations may be performed by the hardware token itself.

In Step 308, a list of public keys is created, with a single element in the list: the server public key from the server certificate that begins the chain of certificates. In one or more embodiments, the list of public keys is created and managed by the hardware token, and may be used to represent the state of the verification of the chain of certificates.

In one or more embodiments, if a server public key is already present in a previously authenticated list of public keys (e.g., stored in the hardware token), and the public key has been used (e.g., to setup a TLS connection) fewer than a predetermined number of times, then the verification and list management steps (from Step 308 to Step 322) may be skipped, and execution resumes with Step 324. That is, in one or more embodiments, it may be unnecessary to re-authenticate a server public key each time it is used.

Step 310 sets up a loop (from Step 312 to Step 318) for processing each certificate in the chain of certificates by selecting the server certificate to be processed in the first iteration of this loop (because the server certificate is the first certificate in the chain of certificates). Successive iterations of the loop verify successive certificates in the chain of certificates, using the public keys of successive certificates, and so on, until a root CA certificate is reached.

In Step 312, the signature of the issuing CA for the selected certificate is verified using the public key of the next certificate in the chain of certificates. That is, the next certificate in the chain of certificates is used to verify the identity (signature) of the CA issuing the selected certificate. (See also FIG. 4 and FIG. 5A-FIG. 5D.) In one or more embodiments, the signature of the selected certificate is decrypted using the public key of the next certificate in the chain of certificates in order to recover the original signature of the issuing CA that had been encrypted using the private key corresponding to the public key of the next certificate. In one or more embodiments, the signature is then verified if the decrypted signature matches the issuing CA named in the selected certificate (it is assumed that only the CA authorized to encrypt the signature would have access to the private key used to perform the encryption). If the signature of the selected certificate cannot be verified, then the selected certificate is rejected, the loop exits, and the authentication fails.

In one or more embodiments, as an optimization, the lists of public keys already present in the hardware token may be consulted each time a public key is extracted from a certificate. In one or more embodiments, if the public key (or a hash of the public key) is already present in an authenticated list of public keys (see Step 322 below), then it is unnecessary to re-authenticate the public key. In one or more embodiments, the previously authenticated public key will be authenticated again only when the authenticated public key has already been used (e.g., to setup a TLS connection) more than a predetermined number of times. With this optimization, the same public key may be used several times without needing to repeatedly verify that public key. The basis for this optimization is the assumption that the hardware token provides a physically secure barrier against potential attackers, and therefore the integrity of a previously authenticated public key may be trusted.

In one or more embodiments, as a space-saving measure (e.g., since the hardware token may have limited memory resources), a hash (also known as a digest, or a cryptographic hash) of each public key may be stored in the list of public keys, instead of storing the public key itself. Since the hash maps data of any length into a fixed-length sequence, the hash may be significantly smaller than the public key. A hash of each public key may be computed, which may be compared to the hashes of public keys already stored in a list of public keys in the hardware token. If the hash is already stored in the hardware token, then it may be unnecessary to re-verify the public key corresponding to the hash.

In Step 314, the public key of the next certificate (i.e., the certificate used verify the selected certificate in Step 312 above) is added to the list of public keys. In one or more embodiments, a public key is added to the list each time a public key is used to verify the next certificate in the chain of certificates (see FIGS. 5A-5D).

In Step 316, the next certificate (i.e., the certificate used to verify the selected certificate in Step 312 above) is compared to the trusted root CA certificate already stored in the hardware token. In one or more embodiments, if the two certificates match, the server public key is authenticated, and the loop exits, since the integrity of all certificates in the chain of certificates has been verified, now that the trust anchor (the trusted root CA certificate stored in the hardware token) has been reached.

In one or more embodiments, if the trusted root CA certificate contains a signature (e.g., if the trusted root CA certificate is self-signed by the trusted root CA certificate's own private key), then the signature of the trusted root CA certificate may be verified using the public key of the trusted root CA certificate. Furthermore, if the certificate matching the trusted root CA certificate contains a signature, then the signature of the matching certificate may be verified using the public key of the matching certificate.

Otherwise, if the two certificates do not match, in Step 318, the next certificate becomes the new selected certificate and the loop repeats in Step 312, this time with the new selected certificate. In this manner the verification loop works its way iteratively through the chain of certificates until the trusted root CA certificate is reached (representing the trust anchor). If there is no next certificate, then the loop exits and the authentication fails.

In one or more embodiments, as an optimization, the loop may also exit upon reaching any certificate whose corresponding public key is already stored in an authenticated list of public keys in the hardware token.

In one or more embodiments, the successful authentication may permit other functions of the hardware token to be activated, for all or part of the duration of a current session (e.g., a TLS session).

In Step 322, the public key list beginning with the server public key is tagged as authenticated, so that any public key in this list will be considered to be already authenticated in the future.

In Step 324, a secret message (e.g., a TLS pre-master secret) is encrypted using the now-authenticated server public key to obtain an encrypted secret message. In one or more embodiments, the encrypted secret message may serve as a basis for generating session keys during a secure connection.

In Step 326, the encrypted secret message is sent to the client device (see also previous description of Step 208).

In Step 328, in one or more embodiments, the encrypted secret message is used by the client device to establish a secure connection (e.g., TLS handshake) with the server that owns the authenticated server public key. For example, both the client device and server may generate a TLS master secret and session keys based on the encrypted secret message (the TLS pre-master secret). The session keys are typically symmetric keys used for both encryption and decryption of information exchanged during a TLS session (symmetric encryption has the advantage of being faster than asymmetric, public key encryption).

Figure 4:
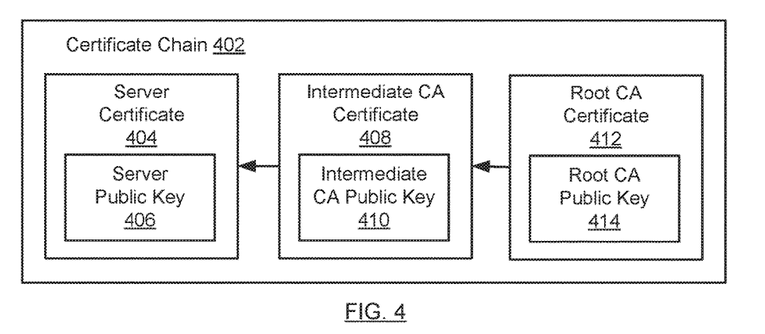
FIG. 4 shows an example in accordance with one or more embodiments disclosed herein.

The following example is for explanatory purposes only and not intended to limit the scope of embodiments disclosed herein. FIG. 4 illustrates a certificate chain (402) received by the hardware token. FIGS. 5A-5D illustrate the states of a public key list (502) within the hardware token as verification proceeds through the certificate chain (402) (during successive iterations of Step 312 in FIG. 3). The elements of the public key list (502) correspond to the public keys (406, 410, 414) in the certificates (404, 408, 412) in the certificate chain (402). The certificate chain (402) begins with a server certificate (404), followed by an intermediate CA certificate (408), and ends with a root CA certificate (412). In one or more embodiments, the certificate chain (402) may contain any number of intermediate CA certificates.

When the public key list (502) is created (see Step 308 of FIG. 3), it contains a single element, a server public key (504), corresponding to the server public key (406) of the server certificate (404). After the server certificate (404) is verified using the intermediate CA public key (410) (see Step 312 of FIG. 3), then the intermediate CA public key (506) is added to the public key list (502) (see Step 314 of FIG. 3). After the intermediate CA public certificate (408) is verified using the root CA public key (414) (during the next iteration of Step 312), then the root CA public key (508) is added to the public key list (502) (during the next iteration of Step 314). After confirming that the root CA public certificate (412) matches the trusted root CA certificate already stored in the hardware token (see Step 316), the public key list (502) is tagged as authenticated (510) (see Step 322 of FIG. 3). Furthermore, during future attempts to authenticate a certificate chain, the now-authenticated public key list (502) may be used to determine whether a public key in a certificate has already been authenticated.

Figure 6:
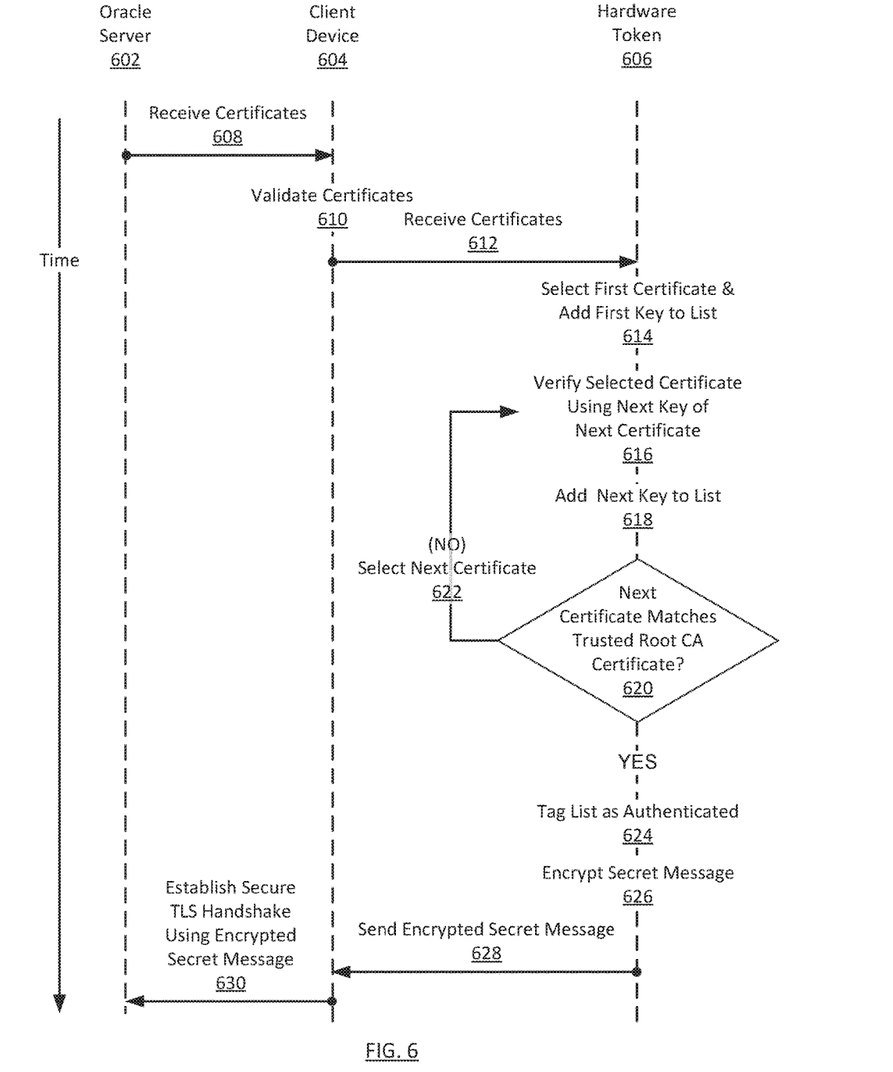
FIG. 6 shows an example in accordance with one or more embodiments disclosed herein.

The following example is for explanatory purposes only and not intended to limit the scope of embodiments disclosed herein. FIG. 6 illustrates, in accordance with one or more embodiments, the relative timing of steps that may be performed by a server (602) ((104) in FIG. 1), a client device (604) ((102) in FIG. 1), and a hardware token (606) ((114) in FIG. 1), in accordance with the flowcharts in FIG. 2 and FIG. 3. In this scenario, a client device (604) seeks to authenticate a server (602), using the cryptographic capabilities and physical protection of a hardware token (606) before establishing a secure connection to the server (602).

In Step 608, a chain of certificates is received by the client device (604) from the server (602). In Step 610, the client device (604) validates the chain of certificates before passing the chain of certificates to the hardware token (606). The validation consists of pre-processing steps to check the structure and contents of each certificate in the chain of certificates (e.g., checking the certificate's expiration date and whether the Oracle server (602) named in the certificate is on a list of trusted entities).

In Step 612, the chain of certificates is received by the hardware token (606) from the client device (604).

In Step 614, the hardware token (606) selects the first certificate in the chain of certificates and creates a public key list beginning with the first public key from the first certificate. The first certificate is the server certificate, so the server public key (see FIG. 5A) is added to the list. However, if the server public key is already present in a previously authenticated list (see Step 624 below) of public keys stored in the hardware token, and the public key has been used (e.g., to setup a TLS connection) fewer than a predetermined number of times, then the public key is considered authenticated, and execution resumes with Step 626 below.

Those skilled in the art will appreciate that Step 616, Step 618, Step 620, and Step 622 form a verification loop that iterates over the certificates in the chain of certificates.

Specifically, in Step 616, the hardware token (606) verifies the signature of the selected certificate using the public key from the next certificate in the chain of certificates. On the first iteration of the verification loop the selected certificate is the server certificate, whose signature is verified using the intermediate CA public key of the intermediate CA certificate. On the second iteration of the verification loop the selected certificate is the intermediate CA certificate, whose signature is verified using the root CA public key of the root CA certificate. Note that in general, the chain of certificates may contain any number of intermediate CA certificates between a server certificate and a root CA certificate. As in Step 614 above, if any public key is already present in a previously authenticated list of public keys stored in the hardware token, and the public key has been used fewer than a predetermined number of times, then the public key may be considered authenticated, and execution resumes with Step 626 below.

In Step 618, the hardware token (606) adds the next public key to the public key list. On the first iteration of the verification loop the intermediate CA public key is added to the list (see FIG. 5B). On the second iteration of the verification loop the root CA public key is added to the list (see FIG. 5C).

In Step 620, the hardware token (606) checks whether the next certificate matches the trusted root CA certificate already stored in the hardware token (606), thereby anchoring the root of trust. If so, then the first (server) public key is authenticated, and execution continues with Step 624 below.

Otherwise, if the two certificates do not match, then in Step 622, the next certificate in the chain of certificates is selected, and the loop repeats starting with Step 616.

Figure 5A:
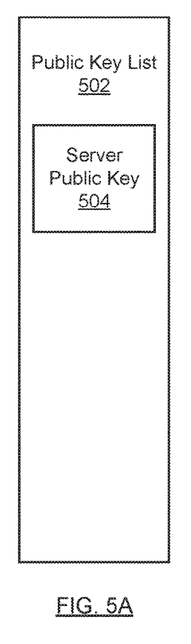
FIG. 5A, FIG. 5B, FIG. 5C, and FIG. 5D show examples in accordance with one or more embodiments disclosed herein.
Figure 5B:
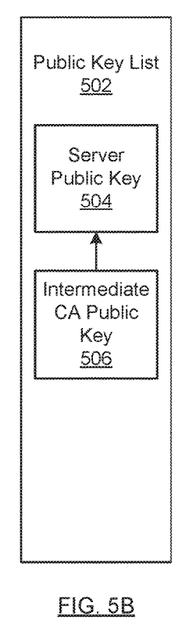
Figure 5C:
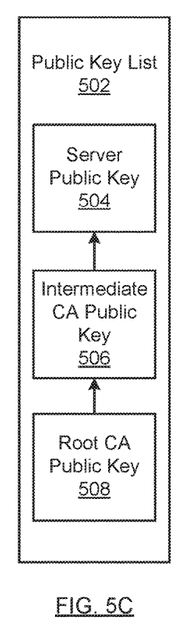
Figure 5D:
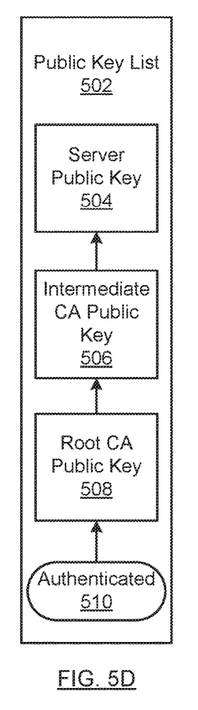

In Step 624, the hardware token (606) adds an authentication tag to the public key list (see FIG. 5D). In Step 626, the hardware token (606) encrypts a secret message using the now-authenticated server public key to obtain an encrypted secret message.

In Step 628, the hardware token (606) sends the encrypted secret message (e.g., a TLS pre-master secret) to the client device (604) to serve as a basis for establishing a secure connection (e.g., session keys may be based on the encrypted secret message).

In Step 630, the client device (604) establishes, using the encrypted secret message, a secure handshake (e.g., in the context of setting up a TLS connection) with the Oracle server (602) that owns the authenticated server public key.

Figure 7A:
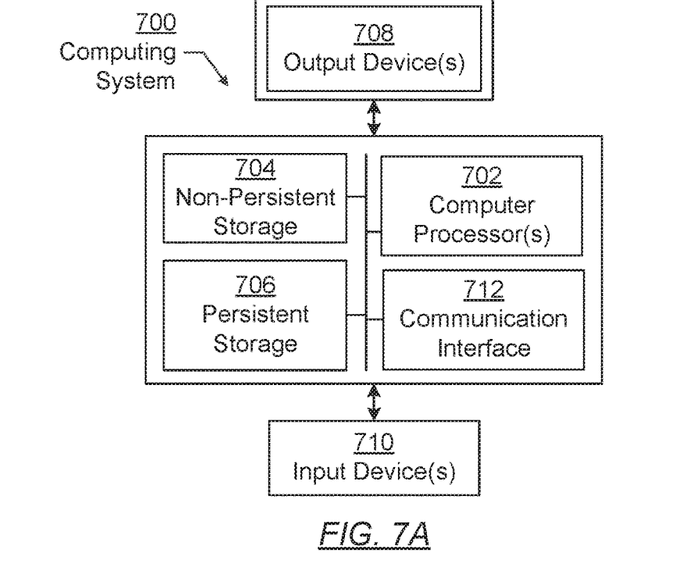
FIG. 7A and FIG. 7B show computing systems in accordance with one or more embodiments disclosed herein.

Embodiments disclosed herein may be implemented on a computing system. Any combination of mobile, desktop, server, router, switch, embedded device, or other types of hardware may be used. For example, as shown in FIG. 7A, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 7B:
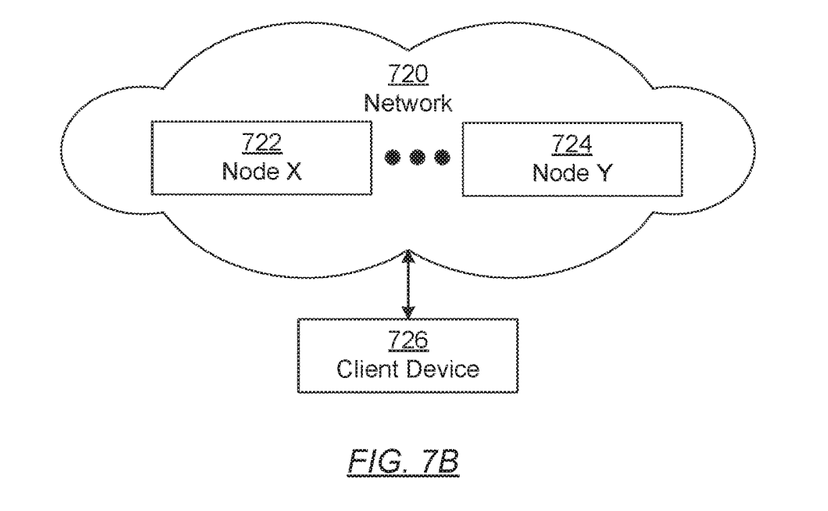

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (700) may be located at a remote location and connected to the other elements over a network.

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7A. Further, the client device (726) may include and/or perform all or a portion of one or more embodiments disclosed herein.

The computing system or group of computing systems described in FIGS. 7A and 7B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 7A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 7A and the nodes and/or client device in FIG. 7B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope as disclosed herein. Accordingly, the scope disclosed herein should be limited only by the attached claims.

What is claimed is:

1. A method, comprising:
receiving, by a hardware token from a client device, a chain of certificates comprising a server certificate and a first root certificate authority (CA) certificate, each certificate in the chain of certificates comprising a public key and a signature;

verifying, by a cryptography application running in a memory of the hardware token, the chain of certificates by:
  verifying, in an iterative manner and starting with the server certificate as a selected certificate, a signature of the selected certificate using a next public key of a next certificate in the chain of certificates, wherein the next public key is considered authenticated and is added to a list of public keys upon the successful verification of the selected certificate;
  omitting authentication of the next public key and tagging the list of public keys as authenticated upon determining that the next public key is present in an authenticated list stored by the hardware token and has been used less than a predetermined number of times; and
  determining that the chain of certificates is verified in response to tagging the list of public keys as authenticated;
authenticating, by the hardware token and based on the verified chain of certificates, a public key of the server certificate in the chain of certificates;
encrypting, by the cryptography application, a secret message using the authenticated public key of the server certificate in the chain of certificates to obtain an encrypted secret message; and
sending, by the hardware token, the encrypted secret message to the client device.

2. The method of claim 1, wherein the memory of the hardware token is inaccessible to any software program external to the hardware token.

3. The method of claim 1, further comprising:
using, by the client device, the encrypted secret message to establish a secure connection with a server named in the server certificate in the chain of certificates.

4. The method of claim 1, further comprising:
offloading, by the hardware token, non-cryptographic operations on one of or more certificates in the chain of certificates to the client device; and
performing, by the client device the non-cryptographic operations on the one or more certificates in the chain of certificates.

5. A system, comprising:
a client device configured to:
  receive, over a network, a chain of certificates comprising a server certificate and a first root certificate authority (CA) certificate, each certificate in the chain of certificates comprising a public key and a signature; and
a hardware token, communicatively associated with the client device, comprising a memory and a cryptography application running in the memory, the hardware token configured to:
  receive, from the client device, the chain of certificates;
  verify the chain of certificates by:
    verifying, in an iterative manner and starting with the server certificate as a selected certificate, a signature of the selected certificate using a next public key of a next certificate in the chain of certificates, wherein the next public key is considered authenticated and is added to a list of public keys upon the successful verification of the selected certificate;
    omitting authentication of the next public key and tagging the list of public keys as authenticated upon determining that the next public key is present in an authenticated list stored by the hardware token and has been used less than a predetermined number of times; and
    determining that the chain of certificates is verified in response to tagging the list of public keys as authenticated;
  authenticate, based on the verified chain of certificates, a public key of the server certificate in the chain of certificates;
  encrypt a secret message using the authenticated public key of the server certificate in the chain of certificates to obtain an encrypted secret message; and
  send the encrypted secret message to the client device.

6. The system of claim 5, wherein the hardware token is further configured to:
determine whether the next certificate in the chain of certificates corresponds to an authenticated certificate stored in the hardware token; and
tag the list as authenticated based on the determination that the next certificate corresponds to the authenticated certificate.

7. The system of claim 6, wherein a first certificate in the chain of certificates is the server certificate, and wherein the authenticated certificate is a trusted root CA certificate stored in the hardware token.

8. The system of claim 5, wherein the memory of the hardware token is inaccessible to any software program external to the hardware token.

9. The system of claim 5, wherein the client device is further configured to use the encrypted secret message to establish a secure connection with a server named in the server certificate in the chain of certificates.

10. The system of claim 5, wherein:
the hardware token is further configured to offload non-cryptographic operations on one or more certificates in the chain of certificates to the client device; and
the client device is further configured to perform the non-cryptographic operations the on one or more certificates in the chain of certificates.

11. A non-transitory computer readable medium comprising instructions that, when executed by a processor, cause the processor to execute the steps of:
receiving, by a hardware token, from a client device, a chain of certificates comprising a server certificate and a first root certificate authority (CA) certificate, each certificate in the chain of certificates comprising a public key and a signature;
verifying, by a cryptography application running in a memory of the hardware token, the chain of certificates by:
  verifying, in an iterative manner and starting with the server certificate as a selected certificate, a signature of the selected certificate using a next public key of a next certificate in the chain of certificates, wherein the next public key is considered authenticated and is added to a list of public keys upon the successful verification of the selected certificate;
  omitting authentication of the next public key and tagging the list of public keys as authenticated upon determining that the next public key is present in an authenticated list stored by the hardware token and has been used less than a predetermined number of times; and
  determining that the chain of certificates is verified in response to tagging the list of public keys as authenticated;

authenticating, by the hardware token and based on the verified chain of certificates, a public key of the server certificate in the chain of certificates;

encrypting, by the cryptography application, a secret message using the authenticated public key of the server certificate in the chain of certificates to obtain an encrypted secret message; and sending, by the hardware token, the encrypted secret message to the client device.

12. The non-transitory computer readable medium of claim 11, further comprising instructions that, when executed by the processor, further cause the processor to execute the steps of:

determining whether the next certificate in the chain of certificates corresponds to an authenticated certificate stored in the hardware token; and tagging the list as authenticated based on the determination that the next certificate corresponds to the authenticated certificate.

13. The non-transitory computer readable medium of claim 12, wherein a first certificate in the chain of certificates is the server certificate, and wherein the authenticated certificate is a trusted root CA certificate stored in the hardware token.

14. The non-transitory computer readable medium of claim 11, wherein the memory of the hardware token is inaccessible to any software program external to the hardware token.

15. The non-transitory computer readable medium of claim 11, further comprising instructions that, when executed by the processor, further cause the processor to execute the steps of:

offloading, by the hardware token, non-cryptographic operations on one or more certificates in the chain of certificates to the client device; and causing the client device to perform the non-cryptographic operations the on one or more certificates in the chain of certificates.

* * * * *

UNITED STATES PATENT AND TRADEMARK OFFICE
CERTIFICATE OF CORRECTION

PATENT NO. : 10,164,963 B2  
APPLICATION NO. : 15/055410  
DATED : December 25, 2018  
INVENTOR(S) : Ponsini et al.

Page 1 of 1

It is certified that error appears in the above-identified patent and that said Letters Patent is hereby corrected as shown below:

In the Claims

In Column 15, Line 38, in Claim 4, after "one" delete "of".

In Column 16, Line 39, in Claim 10, delete "the on" and insert -- on the --, therefor.

In Column 18, Line 18, in Claim 15, delete "the on" and insert -- on the --, therefor.

Signed and Sealed this  
Seventh Day of January, 2020

Andrei Iancu  
*Director of the United States Patent and Trademark Office*